Sept. 30, 1924.  M. DE F. HOOVER ET AL  1,510,060
GAS BURNER
Filed Dec. 5, 1923
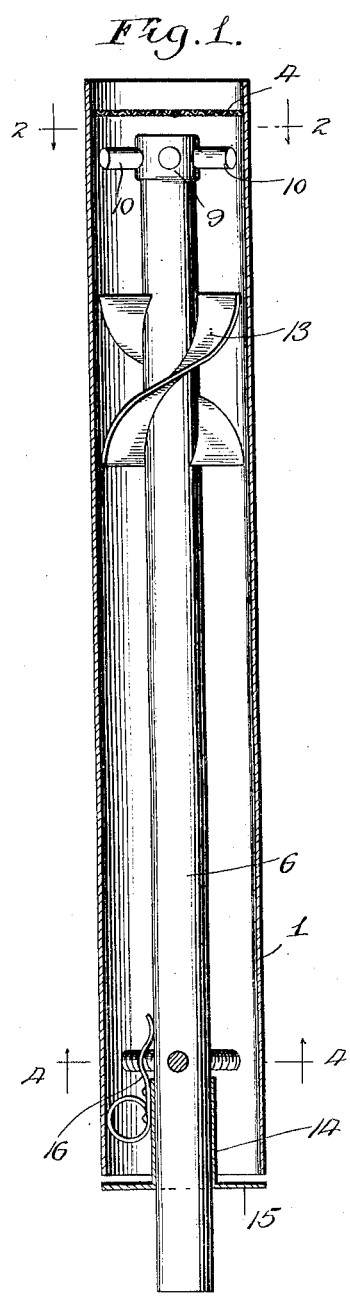
Fig. 1.
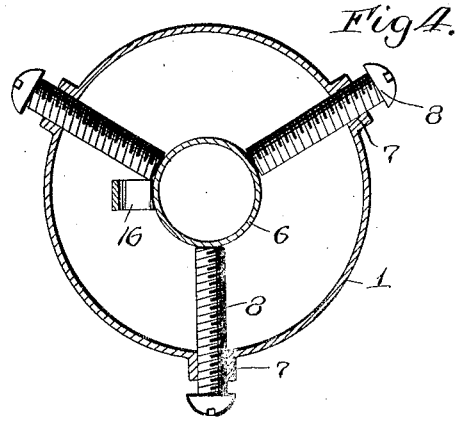
Fig. 4.
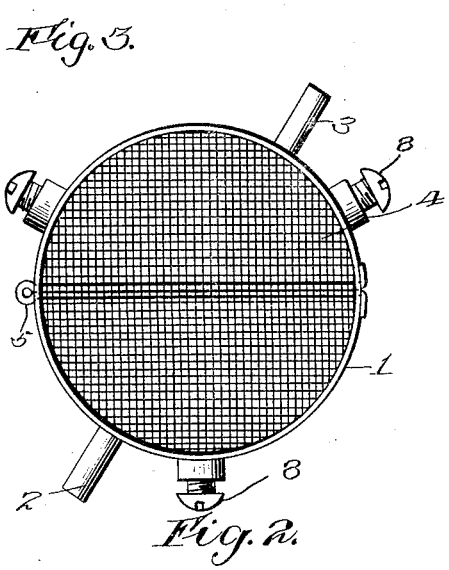
Fig. 3.
Fig. 2.
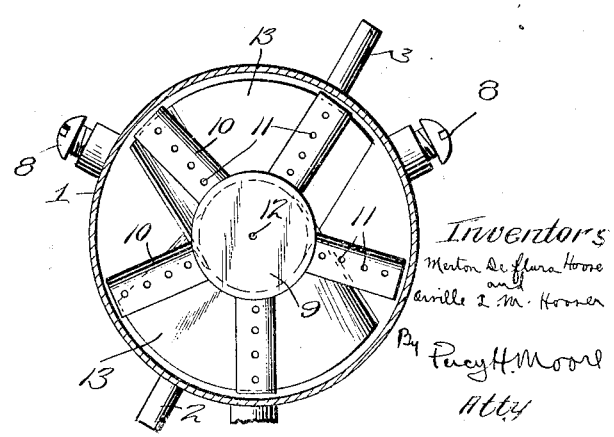
Inventors
Merton De Flura Hoover
and
Orville L. M. Hoover
By Percy H. Moore
Atty Patented Sept. 30, 1924.

1,510,060

UNITED STATES PATENT OFFICE.

MERTON DE FLURA HOOVER AND ORVILLE L. M. HOOVER, OF DALLAS, TEXAS.

GAS BURNER.

Application filed December 5, 1923. Serial No. 678,594.

*To all whom it may concern:*

Be it known that MERTON DE FLURA HOOVER and ORVILLE L. M. HOOVER, citizens of the United States of America, residing at Dallas, in the county of Dallas and State of Texas, have invented certain new and useful Improvements in Gas Burners, of which the following is a specification.

Our invention relates to improvements in gas burners, and is more particularly directed to that type adapted for use in heaters, furnaces, and the like.

The object of our invention is to provide a burner of the class described adapted to thoroughly mix the air and gas prior to its ignition, in order to insure a proper combustion.

A further object of our invention is to provide a construction including a casing having a screen therein, in which casing a burner including a gas header is positioned, and which casing is adjustable with respect to the header in order that the distance between the header and the screen in the mixing chamber may be varied as occasion may demand.

Another object of our invention is to provide a burner including a casing which serves as a mixing tube and in which is arranged a burner, said burner having fixed thereto means for breaking up the air as it is drawn through the mixing tube toward the burner, thus insuring a proper mixing of the air and gas prior to its ignition.

Other objects and advantages of our invention will be apparent from the following description.

In the accompanying drawings:—

Figure 1 is a sectional side elevation of our improved burner.

Figure 2 is a sectional view taken on the line 2—2 of Figure 1.

Figure 3 is a top plan view of Figure 1, and

Figure 4 is a sectional view taken on the line 4—4 of Figure 1.

Referring to the accompanying drawings in detail, wherein like reference characters denote corresponding parts throughout the several views, the numeral 1 indicates a cylindrical tube formed of suitable metal, the same constituting what we shall hereinafter refer to as a mixing tube or chamber for the air and gas. In the actual use of our burner, the mixing tube 1 will be supported by suitable elements carried thereby upon a gas supply pipe, hereinafter described.

The lower end of the mixing tube 1 has secured thereto, upon its exterior, oppositely disposed members 2 and 3 which serve as handles whereby the tube 1 may be moved with respect to the supply pipe.

The upper end of the mixing tube 1 has fitted therein, adjacent its end, a wire screen 4, the same being further supported therein by means of a cross bar 5, which we have disclosed in the drawings as being in the form of a cotter pin. The purpose of the screen 4 being to assist in further breaking up the air and gas as it passes out of the tube or mixing chamber and upon which ignition of the mixture takes place.

The mixing tube 1 is placed over a fixed gas supply pipe 6, and in order that the pipe 6 may be maintained in a fixed position, centrally of the mixing tube 1, the lower portion of the latter has carried thereby a plurality of horizontally arranged screw threaded openings 7 which are adapted to receive therein screws 8, the end portions of which, when screwed inwardly, bind therebetween the pipe 6 and hold the mixing tube in its proper position thereon. By this arrangement, it will be noted that the space between the header and the mixing screen may be varied, thus increasing the space, therebetween, as desired.

The upper end of the pipe 6 is threaded to receive thereon a cap 9 which has extending radially therefrom a plurality of small tubular arms 10, each of which has arranged upon its top surface a number of openings 11 through which the gas passes and mingles with the air as it is drawn through the mixing tube. The central portion of the cap 9 is likewise provided with an opening 12.

In order that the air may be thoroughly broken up prior to its mixing with the gas, as it approaches the header of the gas supply pipe 6, we have positioned beneath the burner proper, and fixed to the pipe 6, a pair of spirally arranged blades 13 which are adapted to be impinged by the air as the same passes through the tube.

To control the amount of air passing into the mixing tube 1 we have positioned upon the pipe 6, and slidable thereon, a collar 14 the lower end of which carries a flange 15 adapted to close the lower end of the mixing tube when desired, the upper end of the collar 14 carries a spring element 16 which engages the pipe 6 and holds the collar, together with the flange 15, at any desired position.

From the above description, it will be readily seen that when the gas is permitted to flow in the header of the pipe 6 and from there into the space, between the header and the screen 4, the gas will mix with the air, which is drawn up through the mixing tube 1, past the blades 13, where it is broken up and then into the space between the header and the screen 4. The mixture then passes through the screen 4, where it is further broken up and ignited.

From the foregoing, it is thought that the construction, operation and many advantages of the herein described invention will be apparent to those skilled in the art, without further description, and it will be understood that various changes in the size, shape, proportion, and minor details of construction may be resorted to without departing from the spirit or sacrificing any of the advantages of the invention.

Having thus fully described our invention, what we claim as new, and desire to secure by Letters Patent is:—

1. A burner of the class described comprising a mixing tube through which air is adapted to pass, one end of said tube being closed by a perforated mixing screen, a supply pipe within said tube having a cap thereon, perforated distributing arms radiating from said cap, said mixing tube being adjustable with respect to said supply pipe for varying the space between said cap and screen, means carried by said pipe for breaking up the air as it passes through said tube, a closing element for said tube slidable upon said pipe for controlling the amount of air passing through said tube, and means for maintaining said closing element in any adjusted position upon said pipe.

2. A burner of the class described comprising a mixing tube, a gas supply pipe positioned therein having a cap at one end, gas distributing arms radiating from said cap, a plurality of horizontally disposed threaded openings in said tube, radially disposed screws in said openings adapted to engage said gas supply pipe for holding the tube in any desired position with respect to said pipe.

In testimony whereof we affix our signatures in the presence of two witnesses.

MERTON DE FLURA HOOVER.
ORVILLE L. M. HOOVER.

Witnesses:
 WILLIAM C. BELT,
 A. F. WRIGHT.